March 28, 1944.  E. F. ABER  2,344,955

MILLING MACHINE CUTTER

Original Filed Dec. 30, 1939  2 Sheets-Sheet 1

INVENTOR
Ernest F. Aber
BY
Morrill & Morrill
ATTORNEYS.

March 28, 1944. E. F. ABER 2,344,955
MILLING MACHINE CUTTER
Original Filed Dec. 30, 1939 2 Sheets-Sheet 2
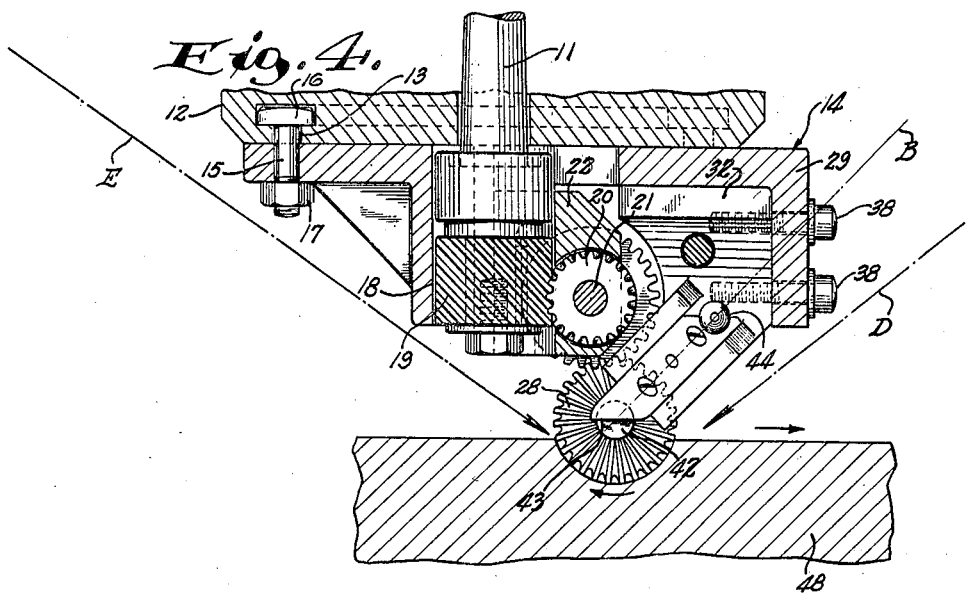
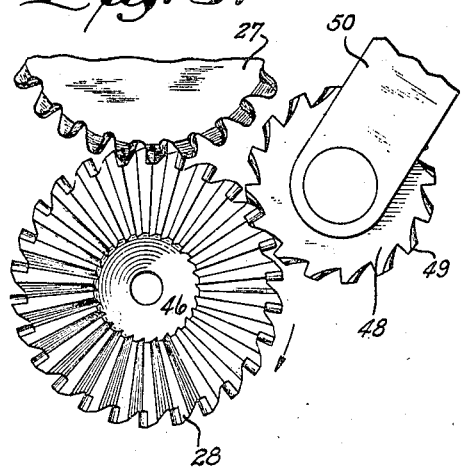
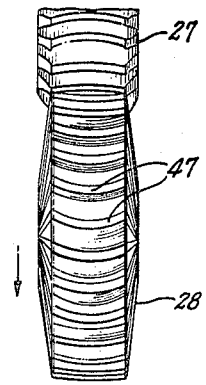
INVENTOR
Ernest F. Aber
BY
Morsell & Morsell
ATTORNEYS Patented Mar. 28, 1944

2,344,955

UNITED STATES PATENT OFFICE 2,344,955

MILLING MACHINE CUTTER

Earnest F. Aber, Waterford, Wis.

Original application December 30, 1939, Serial No. 311,877, now Patent No. 2,322,408, dated June 22, 1943. Divided and this application August 24, 1942, Serial No. 455,837

11 Claims. (Cl. 29—103)

This invention relates to improvements in milling machine cutters and is a division of application Serial No. 311,877, filed December 30, 1939, Patent No. 2,322,408, June 22, 1943, and a continuation in part of application Serial No. 333,067 filed May 5, 1940.

In the use of milling machines it frequently occurs that certain types of recesses such as those of radial type must be cut in the work, necessitating the use of special cutters. Heretofore, a few attempts have been made to devise cherrying attachments for supporting a rotatable cutting wheel but these attachments have been objectionable. In these prior constructions the rotatable cutter has been supported on horizontally disposed arms which are in alinement with the axis of the cutting wheel, whereas the major thrust during cutting is upwardly and at an angle rearwardly with respect to the progress of the cutter relative to the work. As a result, these former cutters were poorly supported and there was excessive chattering during use, resulting in wear on the parts and inferior work. In addition, because of the type of support employed, these cutters have of necessity been supported within the frame work of the attachment, so that the operator's view of the work was obstructed.

The construction of the cherrying attachment including the means for effectively supporting a rotary cutter forms the subject matter of the above mentioned pending application. The present divisional application deals with the structure of the cutter itself, and this cutter while possessing features which make it well adapted for use in the cherrying attachment of the pending application, nevertheless has a wide field of use in milling operations.

It is therefore a principal object of this invention to provide an improved cutting wheel for milling machines wherein the peripheral teeth are curved or substantially U-shaped in plan view to produce a shear type of cut, said teeth also being especially adapted to cooperate with similarly shaped teeth on a driving pinion to eliminate the possibility of lateral play during rotation of the cutting wheel.

A further object of the invention is to provide a rotary cutter having the advantages of obtaining a shear type of cut, of discharging chips before the latter can plug up the recesses between the teeth, and of having a greater number of teeth in contact with the work during cutting.

With the above and other objects in view the invention consists of the improved milling machine cutter and all its parts and combinations as set forth in the claims and all equivalents thereof. In the accompanying drawings illustrating one complete embodiment of the preferred form of the invention in which the same reference numerals designate the same parts in all of the views:

Fig. 4 is a sectional view taken on line 4—4 of Fig. 3 showing the cutting wheel in engagement with the work;

Fig. 5 is a side view on an enlarged scale of the improved cutting wheel and driving pinion therefor, part of the pinion being broken away, the view also showing a modification wherein an additional bracing idler pinion is employed; and Fig. 6 is a front view of part of the mechanism illustrated in Fig. 5.

Figure 1:
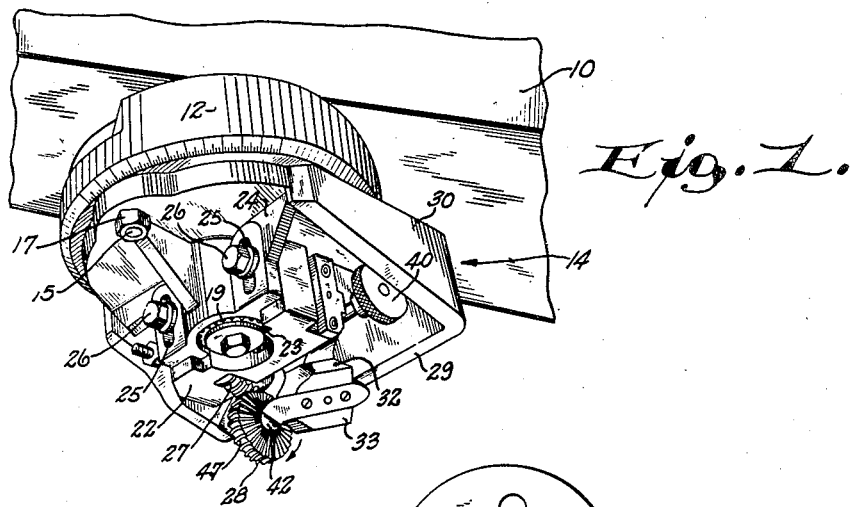
Fig. 1 is a perspective view looking upwardly and at an angle, illustrating the improved attachment connected to a portion of a milling machine.

Referring more particularly to the drawings, the numeral 10 designates the frame of a milling machine which may be of any desired type adapted to impart rotating movement to a vertical spindle 11. The milling machine may have a depending ring shaped supporting member 12 formed on its bottom face with a circular groove 13 which is T-shaped in cross section as illustrated in Fig. 4. The supporting frame 14 for the milling machine attachment may be supported from the bottom of the ring 12 by bolts 15 which have T-shaped heads 16 engageable with the T-shaped groove 13 as shown in Fig. 4. By loosening nuts 17 the member 14 may be adjusted to a desired position around the spindle 11 and held in such position by tightening the nuts.

Rigidly secured to the lower end of the spindle 11 and rotatable in a bore 18 of the frame 14 is a gear 19 having spirally arranged teeth which engage complementary teeth on a gear 20 rigidly mounted on a shaft 21. The shaft 21 has its ends journalled in a block 22 and said block contains a longitudinal half of the bore 18 within which the spiral gear 19 rotates. The block 22 has a tongue and groove engagement 23 with a cross piece 24 of the frame 14 and said cross piece also has vertical slots 25 (see Fig. 1) for the reception of bolts 26 which are threaded into openings in the movable block 22. By loosening the bolts 26 the block 22 may be moved vertically up and down for a purpose to be hereinafter described. Due to the extra length of the spiral gear 19 the cooperating gear 20 is always in engagement therewith in any position of adjustment of the block 22.

Also rigidly mounted on the horizontal shaft 21 is a driving pinion 27 which is cooperable with the teeth of a rotating cutter 28.

The frame 14 has a depending integral front wall 29 and side walls 30 which taper upwardly toward the rear as shown in Fig. 1. Positioned against the top plate 31 of the frame 14 and against the front wall 29 are spaced blocks 32 which have faces 33 disposed at an angle of approximately 45° with respect to the top plate 31 of the frame 14. These faces 33 have grooves 34 cut therein and a dowel pin 35 projects outwardly from each groove. Supporting arms 36 having openings for receiving the upper ends of the dowel pins are fitted in the grooves 34 and are removably retained in position by bolts 37.

Figure 3:
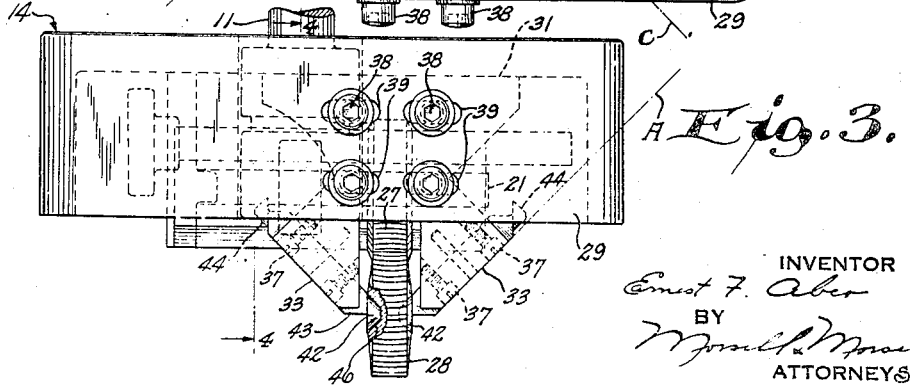
Fig. 3 is a front elevational view thereof.

The blocks 32 are adjustably secured in position by bolts 38 which extend through horizontal slots 39 in the front wall 29 of the frame (see Fig. 3). These bolts are threaded into the blocks 32 and when the bolts are loosened the blocks may be moved apart by manipulation of a hand wheel 40 which rotates a screw 41 having right and left hand threaded sections engageable with threaded bores of the blocks 32.

Figure 2:
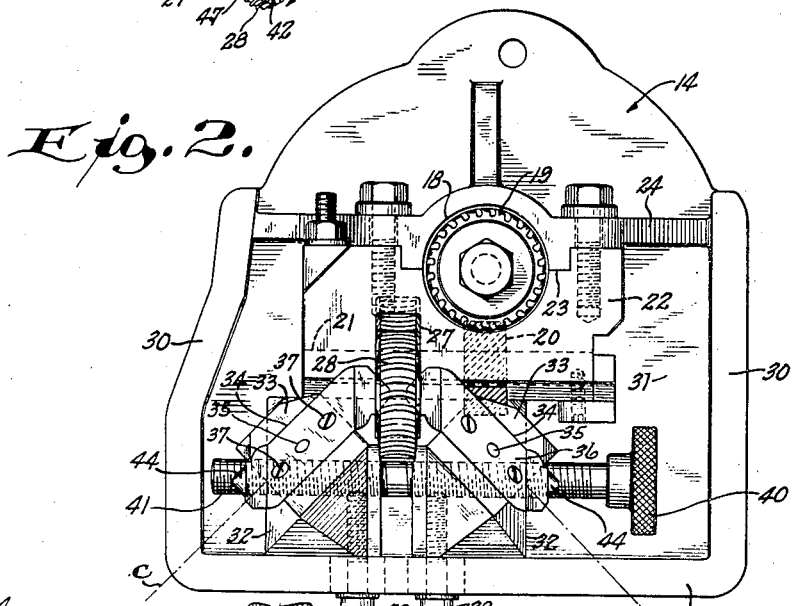
Fig. 2 is a bottom view of the attachment.

It is to be noted that the blocks 32 support the arms 36 at an angle of approximately 45° with respect to the top plate 31 of the frame as indicated by the line A in Fig. 3 and also at an angle of approximately 45° with respect to the front wall 29 of the frame when viewed in front elevation as indicated by the line B in Fig. 4. In addition, these arms are at an angle of approximately 45° with the front wall 29 when considering a horizontal plane and when viewing the work-engaging peripheral portion of the wheel from the position of the work, as indicated by the line C in Fig. 2.

Each of the supporting arms 36 has its outer end formed with an arbor 42 which is in the shape of a truncated cone and the sides of which are at an angle of approximately 45°. The lowermost end of each supporting arm is cut off straight in a horizontal plane as at 43 so that one half of the cone shaped arbor 42 projects below the cut off 43. The other end of each supporting arm 36 is formed in a similar manner except that the arbor 44 is smaller in diameter for cooperation with a smaller arbor hole in a cutting wheel 28. It is apparent that by removing the screws 37 the supporting arms 36 may be reversed in position to permit use of the arbors 44.

The cutting wheel 28 has arbor holes 46 of complementary shape to the arbors 42 and the cutter may be inserted in position while the supporting blocks 32 are spread apart. The hand wheel 40 may then be turned to bring the arbors 42 into engagement with the cutting wheel 28 so that the same is properly supported for rotation in the manner shown in Fig. 3. By having the adjustable block 22 for supporting the driving pinion 27 the driving pinion may be readily moved into engagement with cutting wheels of various diameters.

The cutting wheel 28 is of improved construction as shown in Figs. 5 and 6 and includes peripheral teeth 47 which are preferably curved or substantially U-shaped in plan view as shown in Fig. 6. It is apparent that with this arrangement and with the cutter rotating in the direction indicated by the arrow in Fig. 1 that there will be a shear cut due to the shape of the teeth.

The driving pinion 27 is formed with teeth of similar shape and these teeth interlock during rotation to prevent lateral movement of the cutting wheel and to aid in reducing chattering.

In use of the improved attachment it is apparent that rotation of the vertical spindle 11 from the milling machine will through the spiral gears 19 and 20 transmit rotation to the driving pinion 27, the latter driving the cutting wheel 28 in the direction indicated by the arrows in Figs. 1 and 4. Movement of the work 48 relative to the milling machine in the direction indicated by the arrow in Fig. 4 will set up strains extending upwardly and also in the general direction of the wall 29 of the supporting frame. Due to the angular disposition of the supporting arms as indicated by the lines A, B and C heretofore referred to, these strains are resolved into two equal components and transmitted directly to the front wall 29 of the supporting frame and to the top wall of said frame. Inasmuch as these walls are strong the strains are absorbed without producing chattering of the cutting wheel. It is further to be noted that the method of support by the depending angularly disposed arms positions the axis of the cutting wheel well below the lower edges of the front wall 29 and side walls 30. Thus the operator has clear vision as indicated by the lines D and E of Fig. 4 and may watch his work while the cutting is progressing. In prior devices where the cutting wheel is supported for rotation on horizontal arms, the strains are at right angles to said supporting arms and chattering results. Furthermore, in these structures, due to the method of support the cutting member is well elevated and partially within the supporting frame so that the latter obstructs the operator's vision.

While the angle of 45° for the lines A, B and C has been found to be most desirable it is not intended that this invention be limited to this specific angle as other angles are more or less effective.

It is obvious that when the cutting wheel is rotated in the direction of the arrows that a shear type of cut will be made due to the curve of the teeth. It is also obvious that due to the curve at the ends of the teeth that chips will be discharged before the latter can plug up the recesses between the teeth. Furthermore due to the curve of the teeth there are a greater number of teeth in contact with the work at one time than if a straight tooth cutter were employed. The curved teeth also provide for a greater length of contact with the work and are also stronger due to the fact that the cutting wheel is driven by a pinion having teeth which are similarly curved and lateral play of the cutter during use is prevented and much smoother and quieter operation results.

The advantages of a shear type of cut, of elimination of thrust strains, and of uniform discharge of chips from the curved teeth are obtained either by having the cutting edge on the convex side of each tooth or on the concave side. When the cutting edge is on the concave side the center of the curve of each tooth enters the cut first and the chips begin to flow evenly from each curved end of the tooth, thereby holding or piloting the cutter and aiding in the elimination of thrust strains. Substantially the same action takes place when the cutting edge is on the convex side of the teeth, but in the latter case the chips flow more easily from the cut. It is, therefore, preferred to have the cutting edge on the convex side and to rotate in the direction indicated by the arrow in Fig. 5.

In the modification of Fig. 5, an idler pinion 48 having teeth 49 which are cut on an arc to conform to the shape of the teeth 47 of the cutting wheel 28, is rotatably supported by a forked or other suitable member 50. The upper ends of the member 50 may be secured to one of the supporting blocks 32. It is apparent that with the cutter rotating in the direction indicated by the arrow in Fig. 5, and with a relative feed movement between the cutter and the work in the direction of the arrow in Fig. 4, that the idler 48 will additionally brace the cutter against thrusts in a direction toward said idler 48.

Although only two forms of the invention have been shown and described it is obvious that various modifications and changes may be made without departing from the spirit of the invention and all of such changes are contemplated as may come within the scope of the claims.

What I claim is:

1. A cutting wheel for milling operations comprising a circular metallic member adapted to be rotated in use and having a cutting tooth extending transversely of its periphery, the cutting edge of said tooth being convex in plan view when viewing the periphery of the cutting wheel from immediately above said cutting edge so that successive portions in the length of said cutting edge engage the work as the wheel is rotated and said cutting edge extending transversely of the periphery of the cutting wheel and said cutting edge lying in a surface on the periphery which extends in the same general direction as the axis of rotation of the cutting wheel.

2. A cutting wheel for milling operations comprising a circular metallic member adapted to be rotated in use and having a cutting tooth extending transversely of its periphery, the cutting edge of said tooth extending transversely of the periphery of the cutting wheel and being convex, and the said cutting edge lying in a surface on the periphery which extends in the same general direction as the axis of rotation of the cutting wheel.

3. A cutting wheel for milling operations comprising a circular metallic member adapted to be rotated in use and having a cutting tooth extending transversely of its periphery, the cutting edge of said tooth being convex in plan view when viewing the periphery of the cutting wheel from immediately above said cutting edge so that successive portions in the length of said cutting edge engage the work as the wheel is rotated and said cutting edge extending transversely of the periphery of the cutting wheel and being the arc of the same circle throughout its length.

4. A cutting wheel for milling operations comprising a circular metallic member adapted to be rotated in use and having a cutting tooth extending transversely of its periphery, the cutting edge of said tooth extending transversely of the periphery of the cutting wheel and being convex, and said cutting edge being the arc of the same circle throughout its length.

5. A cutting wheel for milling operations comprising a circular metallic member adapted to be rotated in use and having a cutting tooth extending transversely of its periphery, the cutting edge of said tooth being convex in plan view when viewing the periphery of the cutting wheel from immediately above said cutting edge so that successive portions in the length of said cutting edge engage the work as the wheel is rotated and said cutting edge extending transversely of the periphery of the cutting wheel, and said cutting edge being the arc of the same circle throughout its length, all portions of the effective length of said cutting edge being in substantially the same tangential plane.

6. A cutting wheel comprising a circular metallic member adapted to be rotated in use and having a cutting tooth extending transversely of its periphery, the cutting edge of said tooth extending transversely of the periphery of the cutting wheel and being convex, and said cutting edge being the arc of the same circle throughout its length, all portions of the effective length of said cutting edge being in substantially the same tangential plane.

7. A cutting wheel comprising a circular metallic member adapted to be rotated in use and having a cutting tooth extending transversely of its periphery, the cutting edge of said tooth being convex in plan view when viewing the periphery of the cutting wheel from immediately above said cutting edge so that successive portions in the length of said cutting edge engage the work as the wheel is rotated and said cutting edge extending transversely of the periphery of the cutting wheel, and said cutting edge being the arc of a circle whose center is positioned intermediate the planes of the sides of the cutting wheel.

8. A cutting wheel comprising a circular metallic member adapted to be rotated in use and having a cutting tooth extending transversely of its periphery, the cutting edge of said tooth extending transversely of the periphery of the cutting wheel and being convex, and said cutting edge being the arc of a circle whose center is positioned intermediate the planes of the sides of the cutting wheel.

9. A cutting wheel comprising a circular metallic member adapted to be rotated in use and having a cutting tooth extending transversely of its periphery, the cutting edge of said tooth being convex in plan view when viewing the periphery of the cutting wheel from immediately above said cutting edge so that successive portions in the length of said cutting edge engage the work as the wheel is rotated and said cutting edge extending transversely of the periphery of the cutting wheel, and said cutting edge being the arc of a circle whose center is positioned midway between the planes of the sides of the cutting wheel.

10. A cutting wheel comprising a circular metallic member adapted to be rotated in use and having a cutting tooth extending transversely of its periphery, the cutting edge of said tooth extending transversely of the periphery of the cutting wheel and being convex, and said cutting edge being the arc of a circle whose center is positioned midway between the planes of the sides of the cutting wheel.

11. A cutting wheel for milling operations comprising a circular metallic member adapted to be rotated in use and having cutting teeth extending transversely of its periphery, the cutting edge of each of said teeth being the same and being convex in plan view when viewing the periphery of the cutting wheel from immediately above said cutting edge so that successive portions in the length of said cutting edge engage the work as the wheel is rotated and each cutting edge extending transversely of the periphery of the cutting wheel, and each cutting edge lying in a surface on the periphery which extends in the same general direction as the axis of rotation of the cutting wheel.

EARNEST F. ABER.